(No Model.)
J. WILLETTS & W. BUTTLEAR.
TOOL FOR FORMING THE OPEN ENDS OF HOLLOW GLASSWARE.
No. 280,546. Patented July 3, 1883.
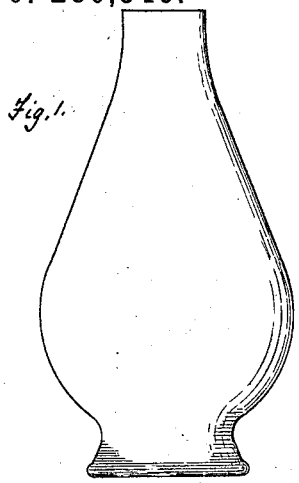
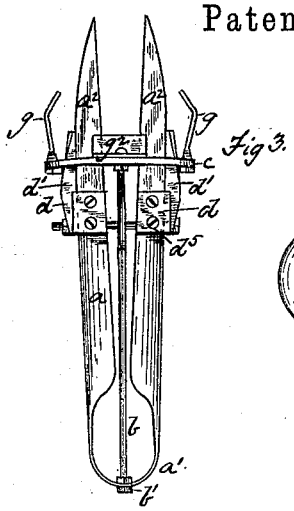
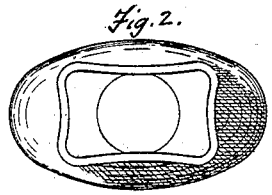
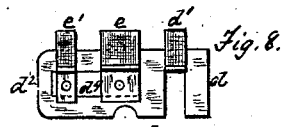
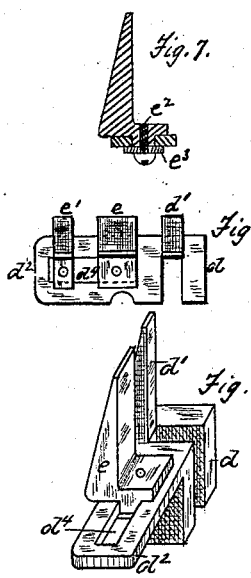
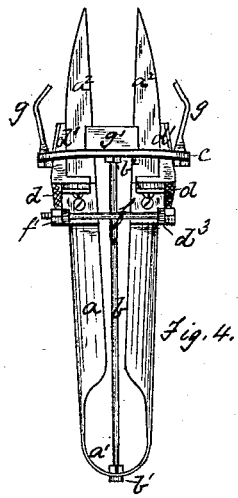
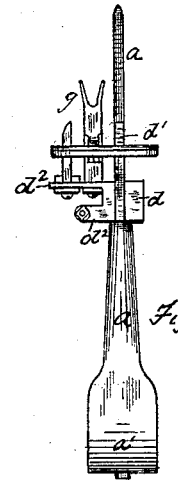
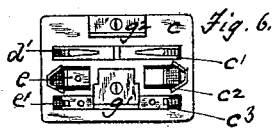
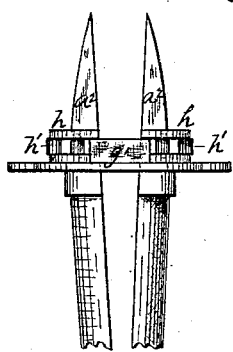
Witnesses
Jno K Smith
L. C. Fitler
Inventor
Jesse Willetts
William Buttlear
by their attys
Bakewell & Kerr
N. PETERS, Photo-Lithographer, Washington, D. C.

UNITED STATES PATENT OFFICE.

JESSE WILLETTS AND WILLIAM BUTTLEAR, OF PITTSBURG, PA.

TOOL FOR FORMING THE OPEN ENDS OF HOLLOW GLASSWARE.

SPECIFICATION forming part of Letters Patent No. 280,546, dated July 3, 1883.

Application filed April 30, 1883. (No model.)

*To all whom it may concern:*

Be it known that we, JESSE WILLETTS and WILLIAM BUTTLEAR, of Pittsburg, in the county of Allegheny and State of Pennsylvania, have invented a new and useful Improvement in Tools for Forming the Open Ends of Hollow Glassware; and we do hereby declare the following to be a full, clear, and exact description thereof, reference being had to the accompanying drawings, forming part of this specification, in which—

Figures 1 and 2 are side and end views of a lamp-chimney. Figs. 3 and 4 are opposite side views of our improved chimney-tool. Fig. 5 is an edge view. Fig. 6 is a plan view. Figs. 7, 8, and 9 are detail views. Figs. 10 and 11 are views of a modification.

Like letters of reference indicate like parts in each.

Broadly stated, our invention consists of a tool having formers capable of being inserted into and shaping the open end of an article of glassware by expanding against its inner surface, whereby the open end is stretched in the direction of the expansion of the tool.

It also consists in combining such a tool with a pair of ordinary glass-shears. The ordinary shears are used to give a round form to the lower end of lamp-chimneys by inserting one or both the blades into the heated open end of the chimney as it is rotated on the arm of a chair. The shears are so manipulated as to cause the soft glass to assume the form of a plain or flared cylinder. It is practically impossible to manufacture angular or oval-ended chimneys by the use of the shears, for the reason that their ability to shape the glass depends mainly on the rotation of the glass against their edges, and also because the uniformity of the product must depend solely upon the eye of the workman. So far as we are aware, no tool capable of being inserted into the end of the chimney and then shaping it by simply expanding against its inner surface while the chimney is at rest has ever been devised. The shape thus imparted to the glass being other than round, it is impossible to obtain it if the glass is moved fast or rotated on the forming-surface. It must therefore retain a fixed position relatively to the forming-blades. As the shape of the opening when the forming device is inserted into it is round, the expansion of the forming devices transforms it to the figure bounding the formers when fully expanded therein.

We will now describe the particular modification of our invention which is shown in the drawings.

The tongs or shears $a$ are of the usual form, having a spring-bow, $a'$, and forming-blades $a^2$. Secured to a rod, $b$, which is fastened to the bow $a'$ by nuts $b'$, is a flat stop, plate, or head, $c$, which is screwed onto the threaded end of the rod $b$ against the nut $b^2$. The plate $c$ is slotted, as at $c'$, for the passage of the blades $a^2$. On the stems of the blades $a^2$ are sleeves $d$, which are provided with blades $d'$, extending up a short distance along the outer edges of the blades $a^2$, and projecting through the outer ends of the slot $c'$. They also have plates $d^2$ extending at right angles and parallel to the plate $c$, and lugs $d^3$ under the plates $d^2$. The plates $d^2$ are slotted, as at $d^4$, and adjustably secured in the slots are two blades, $e$ $e'$, being fastened by screws $e^2$ and washers $e^3$. The blades $e$ $e'$ extend up through the slots $c^2$ and $c^3$ in the plate $c$. A bolt, $f$, having a head at one end and a nut, $f'$, at the other, extends through the lugs $d^3$. The spring-bow $a'$ tends constantly to spread the blades $a^2$ apart, and the bolt $f$ limits the movement. The sleeves $d$ are adjustably secured to the tongs $a$ by set-screws $d^5$, but may be secured permanently. Projecting up from the plate $c$ are two chimney holding and centering devices, $g$, and two gage-plates, $g'$ and $g^2$.

The tool thus described is designed for making a chimney having a rectangular base, the form of the lower end being a parallelopipedon.

The operation is as follows: The chimney is blown in the usual way of blowing chimneys without a mold. The lower end is reheated and opened on a chair, in the usual way, by means of the blades $a^2$, the workmen rolling the pipe back and forth on the arms of the chair, and while the chimney is thus rotating inserting the blades $a^2$, compressed together, and then permitting them to expand gradually against the inner surface of the chimney. When the end of the chimney is sufficiently large, the tool is compressed and put farther in until the end of the chimney encounters the plate c, and then the tool is permitted to expand in the open mouth of the chimney. This causes the blades or formers d e e' to encounter the plastic glass and cause it to assume the form of a parallelopipedon, as illustrated in Fig. 2. The long sides of the chimney-base are kept straight, or nearly so, by the plates $g'$ $g^2$, one of which comes inside and the other outside.

The modification shown in Figs. 10 and 11 is designed for forming a chimney with an oval base. Here the sleeves b have circular arms h, in which are journaled small friction-rollers h', having their peripheries projecting slightly beyond the sides of the arms. When this tool is inserted into the end of the chimney and expanded, the faces of the rollers encounter the glass and are rotated on their axes by contact therewith as the arms move outward. The purpose of the rollers h' is to prevent the glass from crizzling, as it would do if the forming-faces of the jaws h were plain.

We do not limit ourselves to expanding-formers attached to the shears, but claim them also when in a separate tool for shaping the glass by expanding against its sides, as described. Neither do we limit ourselves to the spring-yoke a' for giving the expanding movement to the formers, as such movement may also be obtained by springs of other form, or by a cam or a screw device.

By changing the relative arrangement and shape of the formers to suit, any desired form other than a circle may be given to the end of the chimney—such, for instance, as an oval, square, or other polygonal shape. Heretofore these shapes could be practically made only in a mold; but experience has demonstrated that molded chimneys are much more liable to break than those not made in a mold; and in the ability to form the lower ends of chimneys of these shapes without the use of a mold consists the greatest utility of our invention, for we are thereby enabled to obtain all the durability of non-molded chimneys. We also obtain uniformity of product, because they are all made on a common former.

We have described our invention as applied to forming the ends of lamp-chimneys; but we do not, however, limit ourselves to such use, but claim it also for forming the open ends of glass articles generally.

We are aware that machines having rotating expanding-formers have been devised for opening and finishing the lower ends of lamp-chimneys; but such devices differ from ours in that, owing to their rotation, they can communicate only a round or cylindrical shape to the chimney, and because they are not fitted for use as non-rotatory tools.

We are also aware a non-rotatory expansible tool has been devised for crimping, flaring, and longitudinally fluting the upper ends of lamp-chimneys; but such tool differs from our invention in that the outer ends of the fluting ribs or blades are united at the point of the tool, and are made to operate on the glass by being opened like an umbrella, so that they cause the end of the chimney to have a flared form, and cannot possibly be used for finishing the lower end of a chimney, which operation requires the ends of the blades to be free and to be capable of expanding in the chimney as far, or nearly so, as at its extreme lower end.

What we claim as our invention, and desire to secure by Letters Patent, is—

1. The combination, with a pair of glass-maker's shears, of one or more formers attached to the blades or arms of said shears, and capable therewith of being inserted into and of expanding inside of an open-ended article of glassware, substantially as and for the purposes described.

2. The combination, with a pair of glass-maker's shears, of one or more formers attached to the blades or arms of said shears, and capable of adjustment thereon either laterally or longitudinally, or both, substantially as and for the purposes described.

3. The combination, with a pair of glass-maker's shears, of one or more formers attached to the blades or arms of said shears, and a stop for limiting the insertion of said formers into an open-ended article of glassware, substantially as and for the purposes described.

4. The combination, with a pair of glass-maker's shears, of one or more adjustable formers attached to the blades or arms of said shears, and a stop-plate for limiting the insertion of said formers into an open-ended article of glassware, which plate is slotted for the passage of the shears and formers, substantially as and for the purposes described.

5. A non-rotatory tool for giving a shape other than round to the open end of glass articles, consisting of two or more formers having free outer ends capable of being entered into the end of the article and of communicating the desired shape thereto by simply expanding against its inner sides, substantially as and for the purposes described.

In testimony whereof we have hereunto set our hands this 25th day of April, A. D. 1883.

JESSE WILLETTS.
WILLIAM BUTTLEAR.

Witnesses:
W. B. CORWIN,
T. B. KERR.